UNITED STATES PATENT OFFICE.

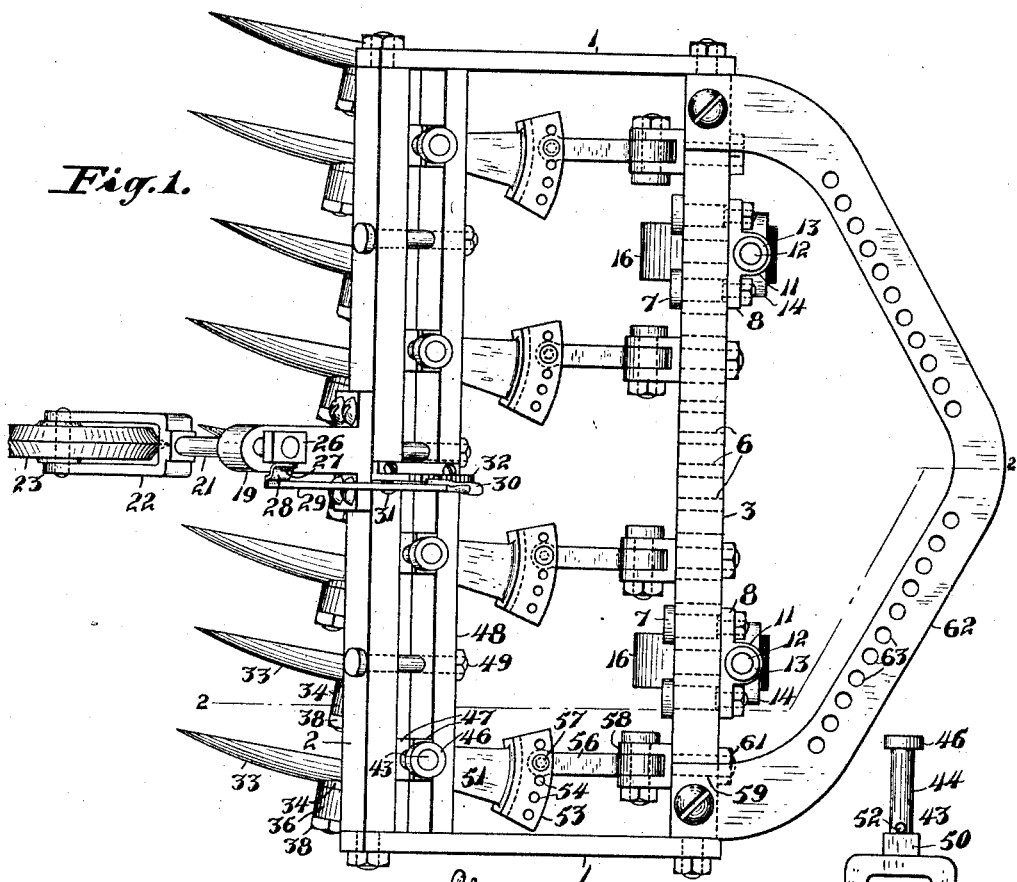

MARTIN A. MAAS, OF SUNNYVALE, CALIFORNIA, ASSIGNOR OF TWO-FIFTHS TO JOSEPH MONIS, OF SUNNYVALE, CALIFORNIA.

DISK CULTIVATOR.

1,116,454.   Specification of Letters Patent.   Patented Nov. 10, 1914.

Application filed October 25, 1913. Serial No. 797,308.

*To all whom it may concern:*

Be it known that I, MARTIN A. MAAS, a citizen of the United States, residing at Sunnyvale, in the county of Santa Clara and State of California, have invented new and useful Improvements in Disk Cultivators, of which the following is a specification.

My invention relates to improvements in disk cultivators, the object of the invention being to provide an apparatus of this character which will overcome the tendency to move sidewise on account of the thrust on the disks of the ground through which the disks are traveling, and in which the draft will be equal on both sides; also one in which the angle which the disks make with the direction of traveling may be conveniently regulated; in which the disks can be quickly and conveniently turned to change from right to left plowing or conversely; in which disks can be conveniently and quickly assembled or removed to form a disk harrow or a disk plow as may be desired, or for check making; by which the ground can be cultivated close to the trees, and the depth of the plowing can conveniently and quickly be varied as desired; in which the disks will be prevented from being raised from the ground by inequalities or obstructions encountered by the cultivator; and of which parts are readily removable and replaceable when worn out.

My invention also resides in the novel construction, combination and arrangement of parts hereinafter fully specified and particularly pointed out in the claims.

In the accompanying drawing, Figure 1 is a plan view of my improved disk cultivator; Fig. 2 is a vertical section thereof on the line 2—2 of Fig. 1; Fig. 3 is an end view of a pair of disks.

Referring to the drawing, 1 indicates side bars of my improved disk cultivator, rigidly connected at their rear ends to a rear beam 2, and between the front ends of which is a front beam 3, the rounded ends of which are pivoted in holes in said front ends. Through said front beam 3 are a number of uniformly spaced horizontally extending holes 6, through two pairs of which are passed, from the rear side, bolts 7 securing two plates 8 on the front beam. Each plate has a guide 11 for a vertical stem 12 having a head 13 and a forked lower end 14, in which is rotatably mounted a roller 16. A spring 17 is coiled around the stem and compressed at the top by the plate 8 and at the bottom by the upper portion of said fork 14.

To the center of the rear side of the rear beam 2 is secured by bolts an upwardly extending guide 19 for a stem 21, in the forked lower end of which is rotatably mounted a rear roller 23. Secured around the upper portion of said stem 21 is a collar 26 from one side of which extends a pin 27, to which is pivoted the upper end of a link 28, the lower end of which is pivotally connected to the lower end of a lever 29, having a fulcrum 31 upon the rear beam 2, the upper arm of which lever can move in proximity to a segment rack 32 and can be supported at any desired angle by a latch 30 engaging said rack. By varying the inclination at which said lever is supported, the height of the cultivator frame with reference to the rear roller can be raised or lowered as desired to vary the depth at which the cultivator disks cultivate or plow the ground. Said disks, shown at 33, are of the form usual in this class of apparatus, and have removable hubs 34 adjacent to their convex side. Said hubs 34 rotate in bearings 36 and are secured in said bearings by bolts 37, the heads of which are on the concave sides of the disks, and which extend through central holes in said disks and through the hub 34. Upon their threaded ends projecting beyond the hubs and bearings are screwed nuts 38. Said bearings depend from hangers 39, which fit in, and are bolted to, mortised lower ends of fork members 41, said hangers having square tops which fit snugly against square horizontal shoulders 42 of the mortises in said members to prevent the turning of the bearing about the bolts which secure the hangers to the fork members. Said fork members depend in pairs from stems 43, each having a head 46, and an upper round portion 44 contained between half-round blocks 47, which are pressed together by a bar 48 pressed toward the beam 2 by bolts 49. By loosening the nuts on the bolts 49 said stems 43 and therefore also the disks, can be set at any desired height and turned through any desired angle, and by tightening up the nuts again, they may be maintained in such position. As a further means for retaining the disks in the desired position at the desired angle, a lower portion 50 of each stem 43 is square, and is received within in a square hole through the rear end of a regulator arm 51, a pin 52 being passed through said stem above the square portion 50 to retain it in the hole in the regulator arm.

Each regulator arm carries at its front end two parallel spaced horizontal plates 53, each having an arcuate series of vertical perforations 54, the perforations in the two plates registering vertically with each other. Between the plates of each arm extends the rear end of a locking arm 56, through a perforation in which, and also through registering perforations in the upper and lower plates, passes a pin 57. The front end of said locking arm is pivotally secured in a fork 58, secured to a bolt 59 extending forwardly through the corresponding one of the series of holes 6 in the front beam 3, a nut 61 being secured on the threaded front end of said bolt. Thus each disk stem is secured against a turning movement about a vertical axis. And by variably selecting the pair of perforations in the upper and lower plates 53 through which is passed the pin 57, the angle at which said disks are so secured to the direction of travel may be varied as desired.

To the ends of the front beam 3 are secured the ends of a curved forwardly extending drawbar 62 through which are a number of uniformly spaced holes 63 at which power can be applied to draw the cultivator.

My improved cultivator will now be seen to possess the following advantages:—By reason of the draft being selectively applied to any portion of the drawbar, the tendency to sidewise movement due to the pressure on the disks of the ground through which they are traveling is counteracted whatever be the nature of the ground, and the cultivator moves ahead in a straight line. The disks can readily be set at any angle and height desired. By removing one disk of each pair of disks the cultivator may be quickly changed from a disk harrow to a disk plow, and by replacing the disks the reverse change is effected. By arranging the disks of each pair so that their concave sides face toward one another, the cultivator can be used for making checks or irrigation ridges, which at present is effected by plowing in opposite directions, so as to make two furrows close together. By arranging the supporting rollers in the middle instead of at the side, the ground can be cultivated close to the trees, and it will be observed that the outside disk can be raised relatively to the other disks so that the cultivation on the outside is shallow, to avoid cutting the roots of the trees. A very important advantage is that, since the disks depend almost directly from the rear beam, and the front beam cannot tilt down on account of the rollers upon which it is supported, the disks cannot tilt up out of the ground when the cultivator meets with some obstruction, as was formerly the case when the disks were considerably to the rear of the beam from which they depended.

I claim:—

1. In an apparatus of the character described, the combination of a rear beam, disks, hangers for said disks, means for rigidly securing said hangers to the rear beam, side bars to which the rear beam is rigidly secured, a front beam pivotally connected at its ends to said side bars, means connected to the front beam for rigidly holding the disks in planes at the desired angle to the rear beam, and a drawbar connected to said front beam and provided with means for adjustably connecting thereto a draft device by which power may be applied to the apparatus.

2. In an apparatus of the character described, the combination of a rear beam, disks, hangers for said disks, means for rigidly securing said hangers to the rear beam, side bars to which the rear beam is rigidly secured, a front beam pivotally connected at its ends to said side bars, regulating arms extending forwardly from said hangers, plates at the front ends of said arms and having series of holes therethrough, devices pivotally supported upon the front beam, means for connecting the rear ends of said devices with any selected perforations in the plates, and a drawbar connected to said front beam and provided with means for adjustably connecting thereto a draft device by which power may be applied to the apparatus.

3. In an apparatus of the character described, the combination of side bars, a rear beam rigidly attached to said side bars, a front beam pivotally attached thereto, and having a series of perforations, rotary disks, hangers therefor rigidly supported by said rear beam, means engaging said perforations for securing said disks at any desired angle with the direction of travel, rollers, upwardly extending stems having forked lower portions in which said rollers are rotatably mounted, guides for said stems, and means removably engaging said perforations for securing said guides to the front beam.

4. In an apparatus of the character described, the combination of a rear beam, a clamping bar, pairs of clamping blocks between said beam and bar, a hanger between the blocks of each pair, bolts for securing said clamping bar to said beam, means extending forwardly from said hangers, side bars, a front beam supporting the front ends of said side bars, and rearwardly extending means secured upon said front beam and adjustably engaging said forwardly extending means to prevent the turning of the hangers about their axis.

5. In an apparatus of the character described, the combination of side bars, a rear beam rigidly secured to said side bars, a front beam pivotally secured thereto, a rear roller, a stem therefor, a guide for said stem supported by said rear beam, means supported by said rear beam for adjusting the height of said stem in said guide, rollers, stems therefor, guides on the front beam for said stems, and springs interposed between said latter guides and rollers, disks, hangers therefor, and means for adjustably supporting said hangers from said rear beam.

In testimony whereof I have hereunto set my hand in the presence of two subscribing witnesses.

MARTIN A. MAAS.

Witnesses:
H. TRUBSCHENCK,
M. NEVIS.

Copies of this patent may be obtained for five cents each, by addressing the "Commissioner of Patents, Washington, D. C."